(12) United States Patent
Suturdja (10) Patent No.: US 7,610,013 B2
(45) Date of Patent: Oct. 27, 2009

(54) WIRELESS AUDIO FOR ENTERTAINMENT SYSTEMS

(75) Inventor: Sehat Suturdja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 432 days.

(21) Appl. No.: 11/135,557

(22) Filed: May 23, 2005

(65) Prior Publication Data

US 2006/0232704 A1 Oct. 19, 2006

Related U.S. Application Data

(60) Provisional application No. 60/672,249, filed on Apr. 18, 2005.

(51) Int. Cl.
*H04H 40/00* (2008.01)
*H04M 3/00* (2006.01)

(52) U.S. Cl. ............... 455/3.06; 455/418; 725/131; 725/151

(58) Field of Classification Search ........... 455/3.06, 455/3.03, 418–420, 74, 556.1, 92, 66.1; 725/89, 725/102, 134, 131–133, 139–141, 151–153, 725/2
See application file for complete search history.

(56) References Cited

U.S. PATENT DOCUMENTS

| 5,638,112 | A | 6/1997 | Bestler et al. |
| 6,799,056 | B2 | 9/2004 | Curley et al. |
| 7,071,883 | B2 * | 7/2006 | Cubley et al. ............... 343/702 |
| 7,340,263 | B2 * | 3/2008 | Welch ............... 455/466 |
| 7,409,639 | B2 * | 8/2008 | Dempski et al. ............... 715/705 |
| 2002/0069308 | A1 | 6/2002 | Jones et al. |
| 2003/0217369 | A1 | 11/2003 | Heredia |
| 2004/0010565 | A1 | 1/2004 | Hong et al. |
| 2004/0128402 | A1 | 7/2004 | Weaver et al. |
| 2004/0158649 | A1 | 8/2004 | Ophir et al. |
| 2004/0165586 | A1 | 8/2004 | Read et al. |
| 2004/0234088 | A1 | 11/2004 | McCarty et al. |
| 2004/0255326 | A1 | 12/2004 | Hicks et al. |
| 2004/0261112 | A1 | 12/2004 | Hicks et al. |

(Continued)

FOREIGN PATENT DOCUMENTS

EP 0 875 824 A1 11/1998

(Continued)

OTHER PUBLICATIONS

Official Action containing the Search Report and Written Opinion from the intellectual Property Office of Singapore dated May 23, 2007 for Singapore Application No. SG 200601680-2; 15 pages.

(Continued)

*Primary Examiner*—Eugene Yun (57) ABSTRACT

A set top box comprises a signal receiver that includes a front end that receives broadband signals, and a tuner that tunes a channel including audio and video signals. A signal demodulator communicates with the signal receiver and demodulates the audio and video signals. A video processor communicates with the signal demodulator and encodes and transmits the video signals via a first medium. A transmitter communicates with the signal demodulator and transmits the encoded audio signals via a second wireless medium, wherein the first medium and the second wireless medium are different types of media.

51 Claims, 8 Drawing Sheets

U.S. PATENT DOCUMENTS

2005/0009539 A1    1/2005    Yassa
2006/0064730 A1    3/2006    Rael et al.

FOREIGN PATENT DOCUMENTS

| EP | 1 458 195 | 9/2004 |
|----|-----------|--------|
| EP | 1 501 284 A2 | 1/2005 |
| WO | WO 2004/062182 | 7/2004 |

OTHER PUBLICATIONS

Official Action containing the Written Opinion and Search Report from the Intellectual Property Office of Singapore dated Feb. 28, 2007 for Singapore Application No. SG 200601679-4; 7 pages.

Search and Examination Report from the Intellectual Property Office of Singapore dated May 23, 2007 for Singapore Application No. SG 200601678-6; 15 pages.

802.11n; IEEE P802.11-04/0889r6; Wireless LANs, TGn Sync Proposal Technical Specification; 131 pages.

IEEE Std 802.11a-1999 (Supplement to IEEE Std 802.11-1999), Supplement to IEEE Standard for Information technology—Telecommunications and information exchange between systems-Local and metropolitan area networks-pecific requirements- Part 11: Wireless LAN Medium Access Control (MAC) and Physical Layer (PHY) specifications: High-speed Physical Layer in the 5GHZ Band, Sponsor LAN/MAN Standards Committee of the IEEE Computer Society (83 pp.).

IEEE Std 802.11 b-1999 (Supplement to ANSI/IEEE Std 802.11, 1999 Edition); Supplement to IEEE Standard for Information technology—Telecommunications and information exchange between systems-Local and metropolitan area networks-Specific requirements-Part 11: Wireless LAN Medium Access Control (MAC) and Physcial Layer (PHY) specifications: Higher-Speed Physcial Layer Extension in the 2.4 GHz Band, Sponsor LAN/MAN Standards Committee of the IEEE Computer Society (89 pp.).

IEEE P802.11g/D8.2, Apr. 2003 (Supplement to ANSI/IEEE Std 802.11 1999 (Reaff 2003)), IEEE P802.11g/D8.2, Draft Supplement to Standard [for] Information Technology-Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band, Sponsor LAN/MAN Standards Committee of the IEEE Computer Society (69 pp.).

Communication from the European Patent Office dated Aug. 20, 2007 for Application No. 06 005 402.0; 6 pages.

Communication from the European Patent Office dated Aug. 21, 2007 for Application No. 06 005 384.0; 5 pages.

Communication from the European Patent Office dated Aug. 21, 2007 for Application No. 06 005 403.8; 5 pages.

Official Action including the Written Opinion from the Intellectual Property Office of Singapore dated Sep. 14, 2007 for Application No. SG 200601679-4; 4 pages.

* cited by examiner

FIG. 8

WIRELESS AUDIO FOR ENTERTAINMENT SYSTEMS

CROSS-REFERENCE TO RELATED APPLICATIONS

This application claims the benefit of U.S. Provisional Application No. 60/672,249, filed on Apr. 18, 2005, which is hereby incorporated by reference in its entirety.

FIELD OF THE INVENTION

The present invention relates to entertainment systems, and more particularly to wireless audio for entertainment systems.

BACKGROUND OF THE INVENTION

Figure 1:
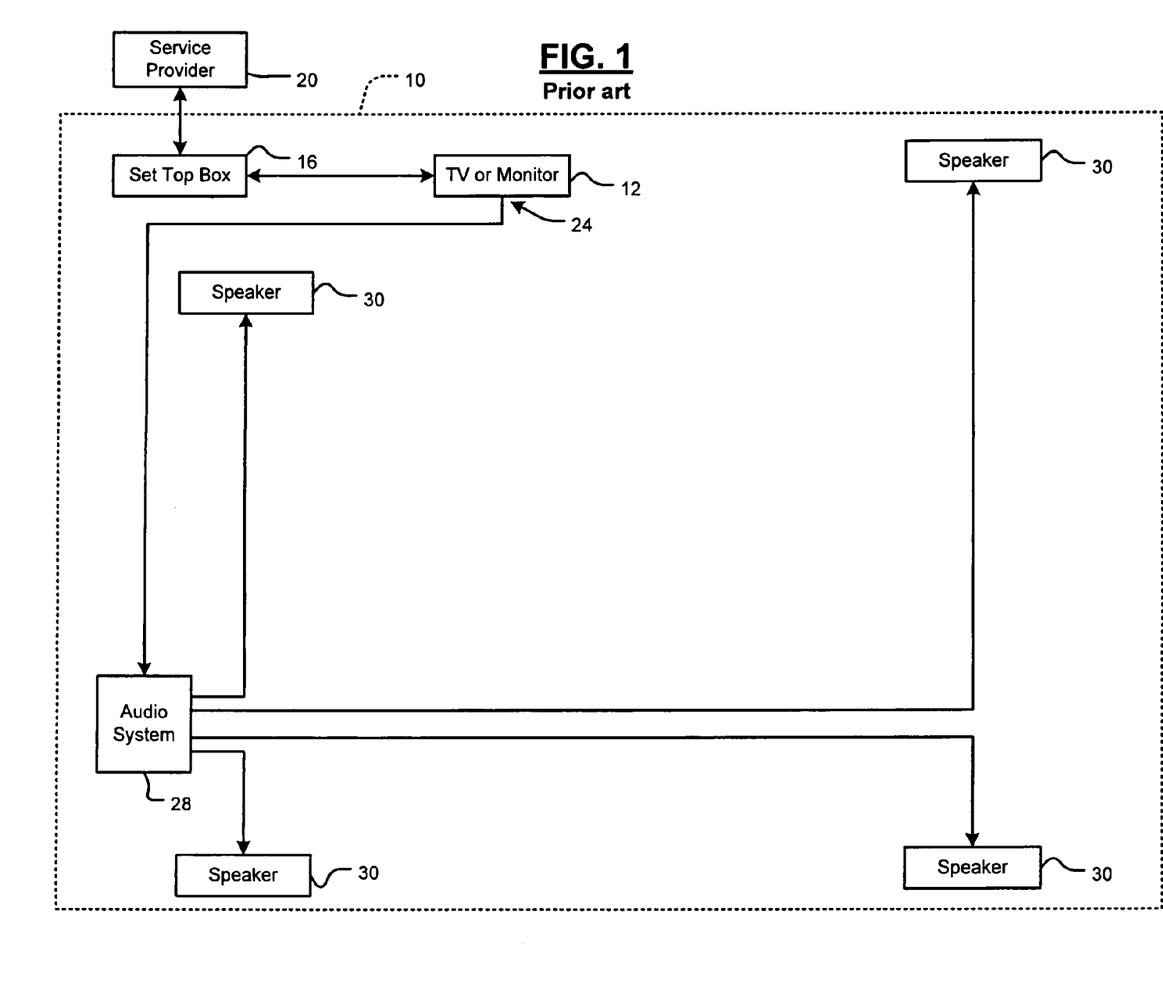
FIG. 1 is a functional block diagram of an entertainment system according to the prior art.

Referring now to FIG. 1, an entertainment system 10 includes a television or monitor 12 such as a conventional television, a liquid crystal display (LCD), a plasma display, a projector, and/or any other display system. A set-top box, cable box or other device 16 (collectively set top box 16) receives content from a service provider 20 such as audio and/or video content. The service provider 20 may be a cable service, a satellite service, a wireless service, a conventional wireless broadcast and/or other suitable service provider.

The set top box 16 outputs content to the TV or monitor 12 that includes video and audio signals. The TV or monitor 12 includes audio outputs 24 that may be connected by connecting wires to an audio system 28. The audio system 28, in turn, is typically connected to one or more speakers 30. The audio output 24 includes one or more channels for mono, stereo, surround or other audio formats. For example, surround sound typically includes 5 or 7 channels.

Oftentimes, the consumer may purchase a particular television or monitor 12 for aesthetic reasons. For example, LCD and/or plasma displays have a relatively small thickness and can be mounted on a wall. Customers purchasing these types of devices prefer to have an uncluttered look. The entertainment system shown in FIG. 1, however, requires a significant amount of wiring to be used between devices such as the set top box 16, the TV or monitor 12, the audio system 28 and/or the speakers 30. While the wiring can be installed through drywall and hidden during construction of a home, the location of components of the entertainment system cannot change very much once installed. When customers add an entertainment system to an existing home, it is often times significantly more expensive to install wiring behind the drywall. Therefore, the wires are usually routed through the room, which is undesirable.

SUMMARY OF THE INVENTION

A set top box comprises a signal receiver that includes a front end that receives digital broadband signals and a tuner that tunes a channel including digital audio and video signals. A signal demodulator communicates with the signal receiver and demodulates the digital audio and video signals. A video processor communicates with the signal demodulator and encodes and transmits the digital video output signals via a first medium. A transmitter communicates with the signal demodulator and transmits digital audio output signals via a second wireless medium. The first medium has a higher bandwidth capacity and a different protocol than the second wireless medium.

In other features, a system comprises the set top box and further comprises a display that communicates with the first medium and an audio system that includes a receiver that communicates with the second wireless medium. The display is selected from a group consisting of televisions and monitors. A first wireless network interface communicates with the video output device. The first wireless network interface is compliant with at least one of I.E.E.E. 802.11a, 802.11b, 802.11g, and/or 802.11n. The set top box is integrated with the display or located remotely from the display. The display further comprises a second wireless network interface that communicates with the first medium.

In still other features, a system comprises the set top box and further comprises an audio system that includes a receiver module that communicates with the audio system and that receives the digital audio output signals via the second wireless medium. The audio system includes a plurality of transmitter modules and further comprises a plurality of speakers each including a receiver module that communicates with a respective one of the transmitter modules. The first bandwidth capacity is greater than 50 Mb/s and the second bandwidth capacity of the second wireless medium is less than 1 Mb/s.

A system comprises a first transceiver that wirelessly receives content. A set top box communicates with the first transceiver, separates the content into audio signals and video signals and outputs the audio signals to the first transceiver and the video signals to a display. The first transceiver wirelessly transmits the audio signals to an audio system.

In other features, a modem receives broadband signals including a plurality of channels and tunes a channel containing the content. A network device communicates with the modem. A second transceiver communicates with the network device and transmits the content to the first transceiver.

In other features, a network device receives broadband signals including a plurality of channels and tunes a channel containing the content. A second transceiver communicates with the network device and transmits the content to the first transceiver. The display is selected from a group consisting of televisions and monitors. The first transceiver wirelessly communicates using at least one of I.E.E.E. 802.11a, 802.11b, 802.11g, 802.11n, 802.16, frequency modulation and ultrawideband (UWB) formats. The audio system includes a plurality of transmitters and further comprises a plurality of speakers each including a receiver that communicates with a respective one of the transmitters.

In other features, the content is transmitted as packets from the second transceiver to the first transceiver. The audio signals and video signals are digital signals.

A system comprises first transceiving means for wirelessly receiving content. Separating means communicates with the first transceiving means, separates the content into audio signals and video signals and outputs the audio signals to the first transceiving means and the video signals to display means for displaying. The first transceiving means wirelessly transmits the audio signals to audio means for generating audible audio signals.

In other features, receiving and tuning means receives broadband signals including a plurality of channels and tunes a channel containing the content. Interface means communicates with the modem. Second transceiving means communicates with the interface means and transmits the content to the first transceiving means.

In other features, interface means receives broadband signals including a plurality of channels and tunes a channel containing the content. Second transceiver communicates with the interface means and transmits the content to the first transceiving means.

In other features, the display means is selected from a group consisting of televisions and monitors. The first transceiving means wirelessly communicates using at least one of I.E.E.E. 802.11a, 802.11b, 802.11g, 802.11n, 802.16, frequency modulation and ultrawideband (UWB) formats. The audio means includes a plurality of transmitting means for transmitting and further comprises a plurality of speakers each including receiving means for communicating with a respective one of the transmitting means.

In other features, the content is transmitted as packets from the second transceiving means to the first transceiving means. The audio signals and video signals are digital signals.

A method comprises wirelessly receiving content using a first transceiver; separating the content into audio signals and video signals; outputting the audio signals to the first transceiver and the video signals to a display; and wirelessly transmitting the audio signals to an audio system using the first transceiver.

In other features, the method includes receiving broadband signals including a plurality of channels; and tuning a channel containing the content. The method includes selecting the display from a group consisting of televisions and monitors. The first transceiver wirelessly communicates using at least one of I.E.E.E. 802.11a, 802.11b, 802.11g, 802.11n, 802.16, frequency modulation and ultrawideband (UWB) formats. The method includes wirelessly transmitting the audio signals from the audio system to receivers associated with a plurality of speakers. The method includes transmitting the content as digital packets from the second transceiver to the first transceiver. The audio signals and video signals are digital signals.

A set top box comprises a signal receiver that includes a front end that receives digital broadband signals and a tuner that tunes a channel including digital audio and video signals. A signal demodulator communicates with the signal receiver and demodulates the digital audio and video signals. A decoder outputs first data packets containing digital audio signals and second data packets containing digital video signals.

In other features, a system comprises the set top box and further comprises an audio system and a first receiver that communicates with the audio system. A second receiver that communicates with a display. A transmitter receives the first and second data packets and wirelessly transmits the first data packets to the first receiver and transmits the second data packets to the second receiver. The transmitter wirelessly transmits the second data packets to the second receiver. The transmitter wirelessly transmits the first data packets to the second receiver. The display is selected from a group consisting of televisions and monitors. The transmitter wirelessly communicates using at least one of I.E.E.E. 802.11a, 802.11b, 802.11g, 802.11n, 802.16, and ultrawideband (UWB) formats. The audio system includes a plurality of transmitter modules and further comprises a plurality of speakers each including a receiver module that communicates with a respective one of the transmitter modules.

A set top box comprises signal receiving means for receiving digital broadband signals and tuning means for tuning a channel including digital audio and video signals. Signal demodulating means communicates with the signal receiving means and demodulates the digital audio and video signals. Decoder means outputs first data packets containing digital audio signals and second data packets containing digital video signals.

In other features, a system comprises the set top box and further comprises audio output means for generating audio signals. First receiving means communicates with the audio output means. Display means displays video signals. Second receiving means communicates with the display means. Transmitting means receives the first and second data packets and wirelessly transmits the first data packets to the first receiving means and transmits the second data packets to the second receiving means. The transmitting means wirelessly transmits the second data packets to the second receiving means. The transmitting means wirelessly transmits the first data packets to the second receiving means. The display means is selected from a group consisting of televisions and monitors. The transmitting means wirelessly communicates using at least one of I.E.E.E. 802.11a, 802.11b, 802.11g, 802.11n, 802.16, and ultrawideband (UWB) formats. The audio means includes a plurality of transmitting means for transmitting and further comprises a plurality of speakers each including receiving means for receiving that communicate with a respective one of the transmitting means.

A method for operating a set top box comprises receiving digital broadband signals; tuning a channel including digital audio and video signals; demodulating the digital audio and video signals; and outputting first data packets containing digital audio signals and second data packets containing digital video signals.

In other features, the method includes receiving the first and second data packets; wirelessly transmitting the first data packets to a first receiver; and transmitting the second data packets to a second receiver. The method includes wirelessly transmitting the second data packets to the second receiver. The method includes wirelessly transmitting the first data packets to the second receiver. The wirelessly communication uses at least one of I.E.E.E. 802.11a, 802.11b, 802.11g, 802.11n, 802.16, and ultrawideband (UWB) formats.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Entertainment systems receive content from service providers that include video and audio content and their corresponding signals. The entertainment system according to the present invention employs a lower cost/bandwidth wireless link to distribute audio signals from a service provider to audio system components while using a higher cost/bandwidth wireless link or hardwired link to the television or monitor. In some implementations, the set top box does not convert the audio and/or video signals to analog form. In other words, the audio and video signals remain in digital form until received at the final output device such as the display, audio system and/or speakers.

The higher cost/bandwidth wireless link from the set top box to the television or monitor include links that are compliant with I.E.E.E. 802.11a, 802.11b, 802.11g, 802.11n and/or other current or future wireless links. Audio signals typically require a bandwidth of 24 Kb/s per channel. Therefore, a five channel audio signal would require 120 Kb/s. The bandwidth of the wireless link to the home audio system will depend upon the number of channels to be supported. For example, the wireless link to the audio system may include a 900 MHz wireless link. Various exemplary configurations will be described further below and serve as illustrative but not limiting implementations.

Figure 2:
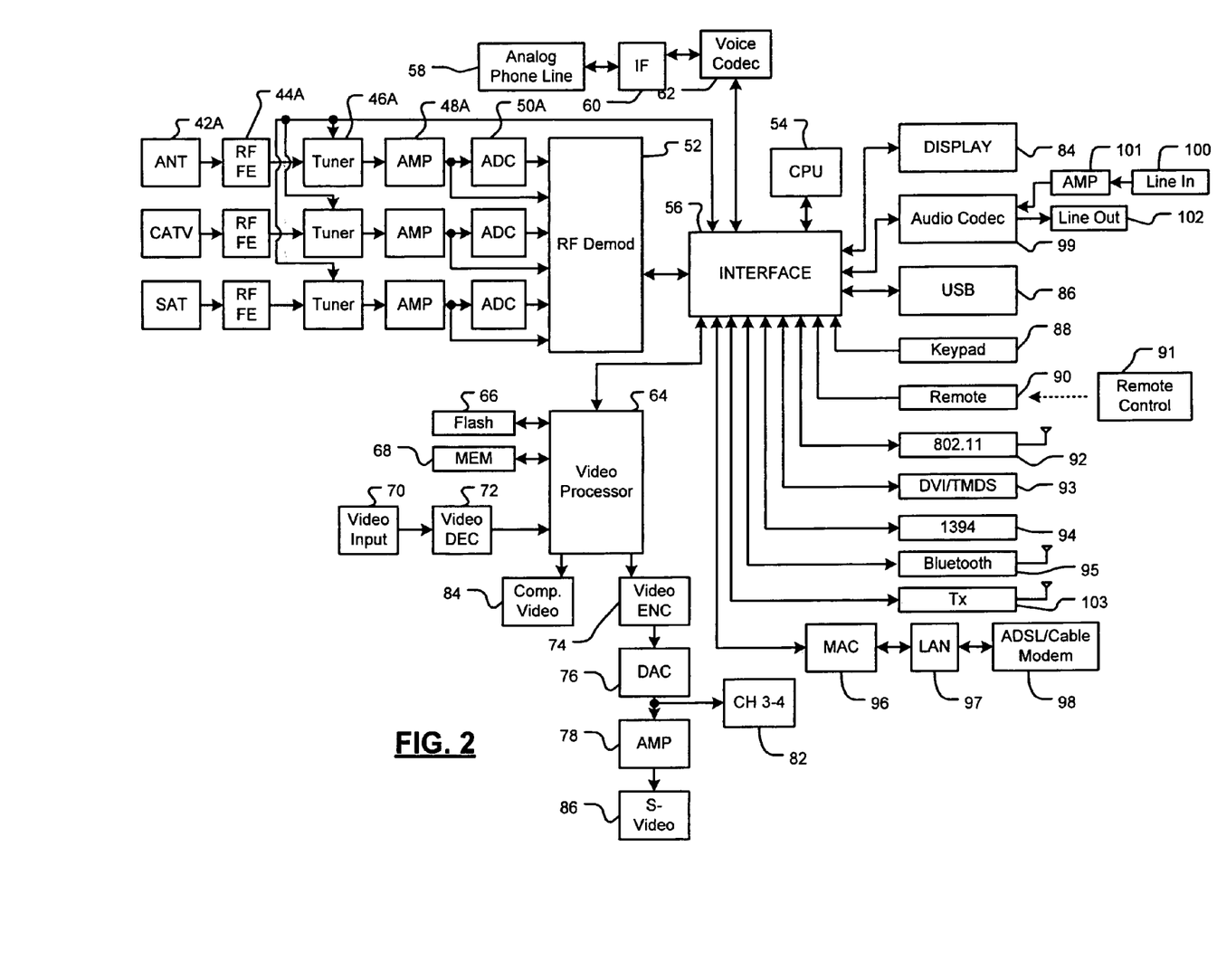
FIG. 2 is a functional block diagram of a set top box according to the present invention.

Referring now to FIG. 2, a set top box 40 according to the present invention is shown. The set top box 40 includes source inputs 42A, 42B and 42C (collectively inputs 42) such as antenna, cable, satellite and/or other inputs. The inputs 42 communicate with a radio frequency (RF) front ends (FE) 44A, 44B and 44C (collectively front ends 44). Tuners 46A, 46B and 46C tune a channel in a broadband signal that is received based on user selection. Amplifiers 48A, 48B and 48C (collectively amplifiers 48) amplify a selected channel. Analog to digital converters (ADCs) 50A, 50B and 50C (collectively ADCs 50) convert the amplified analog channel signal to a digital signal. An RF demodulator 52 performs demodulation. Exemplary demodulation techniques include orthogonal frequency division multiplex (OFDM), quadrature amplitude modulation (QAM), quadrature frequency shift keying (QFSK) and/or other suitable demodulation techniques.

A central processing unit (CPU) 54 communicates with the RF demodulator 52 via an interface 56. In some implementations, the interface 56 is a peripheral component interface (PCI), PCI express and/or any other suitable interface. The CPU 54 may include volatile and/or nonvolatile memory. An analog phone line 58 can be connected via an interface 60 and a voice coder/decoder 62 to the interface 56.

A video processor 64 performs video processing and may include nonvolatile memory 66 such as flash memory, a hard disk drive or other suitable nonvolatile memory and volatile memory such as SDRAM or other suitable volatile memory. A video decoder 72 receives video input 74 and performs suitable decoding such as but not limited to MPEG decoding. A video encoder 74 encodes video signals for output to a digital to analog converter (DAC) 76, an amplifier 78 and an S-video output 80. The output of the DAC 76 can also be output as a channel 3-4 video output 82.

The interface 56 also communicates with a set top box display 84 and/or a display associated with the television or monitor. The set top box 40 may also include a universal serial bus (USB) 86. A keypad 88 may be directly connected to the set top box 40 and/or a wireless interface may be provided. A remote control interface 90 receives infrared signals from a remote control 91 to allow user selection of channels, volume and/or other set top box functions. An 802.11 interface 92 is compliant with at least one of 802.11, 802.11a, 802.11b, 802.11g, 802.11n (which are all hereby incorporated by reference) and other current and future wireless standards. A digital video interface (DVI)/transition minimized differential signaling (TMDS) interface 93, a 1394 or Firewire interface and/or a Bluetooth interface 95 may also be provided. A medium access control (MAC) device 96 may provide an interface to a modem such as a digital subscriber line (DSL), cable, wireless or other broadband service. The MAC device 96 may be integrated with other components of the set top box 40.

An audio coder/decoder codec 99 communicates with the interface 56 and performs audio coding and decoding. The audio codec 99 communicates with a line input 100 and an amplifier 101 and a line output 102. The interface 56 and/or the audio codec 99 also communicate with a transmitter 103 for sending audio signals wirelessly to other devices. The audio signals may also be sent wirelessly via the 802.11 and/or Bluetooth interfaces 92 and 95, respectively. The audio codec 99 may be used to convert the digital audio signals to analog form prior to transmission and/or the digital audio signals may be sent directly via the interface 56 to the transmitter 103.

Figure 3:
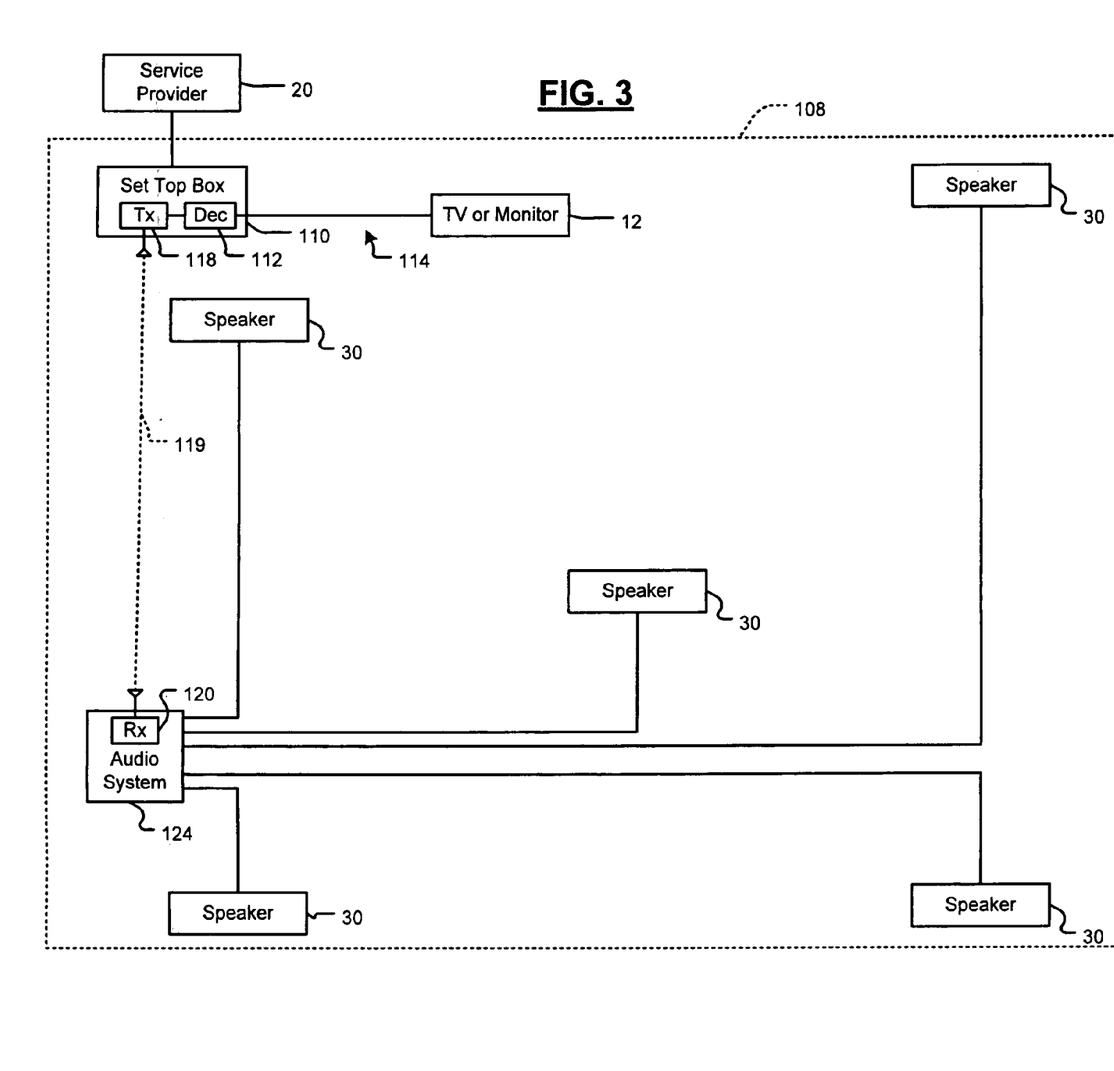
FIG. 3 is a functional block diagram of an entertainment system according to the present invention including a wireless link between the set top box and the audio system.

Referring now to FIG. 3, an entertainment system 108 according to the present invention includes a wireless link between a set top box and an audio system. More particularly, the set top box 110 includes a decoding module 112 that receives content and outputs a video signal 114 to the TV or monitor 12. The decoding module 112 also outputs an audio signal to a transmitter module 118, which transmits the audio signal over a wireless link 119 to a receiver module 120 associated with an audio system 124. As can be appreciated, the receiver module 120 may be integrated with or separate from the audio system 124. In some implementations, the audio signal includes 1, 2, . . . , or N channels. In some implementations, the audio signal supports surround sound and N=5 or 7. For example, the wireless link 119 can be a 900 MHz link. The transmitter 118 can be implemented by the transmitter 103, the 802.11 interface 92 and/or the Bluetooth interface 95, which generates the wireless signal 119.

In use, the set top box 110 receives a broadband signal containing content channels. A user selects a content channel using inputs to the set top box 110 and/or remote control 91. The selected content channel provides a data stream including audio and video content. The decoding module 112 decodes the audio and video content. The audio content or signal includes one or more audio channels that are output to the transmitter module 118. The transmitter module 118 transmits the channels to the receiver module 120.

The receiver module 120 outputs the channels to the audio system 124, which outputs the audio signals to the speakers 30. The connection between the audio system 28 and the speakers can be wired or wireless. If a wireless connection is used, the audio system includes one or more transmitters and the speakers include receivers and shown in FIG. 5. The decoding module 112 outputs the video signal to the TV or monitor 12. In addition, the audio signal may also be output to the TV or monitor 12. In some implementations, the link to the TV or monitor 12 is unidirectional or bidirectional whereas the link to the audio system and/or speakers is unidirectional. In some implementations, the audio and video signals are received in digital form and are separated and output to the television or monitor and the audio receiver in digital form without conversion to an analog format.

Figure 4:
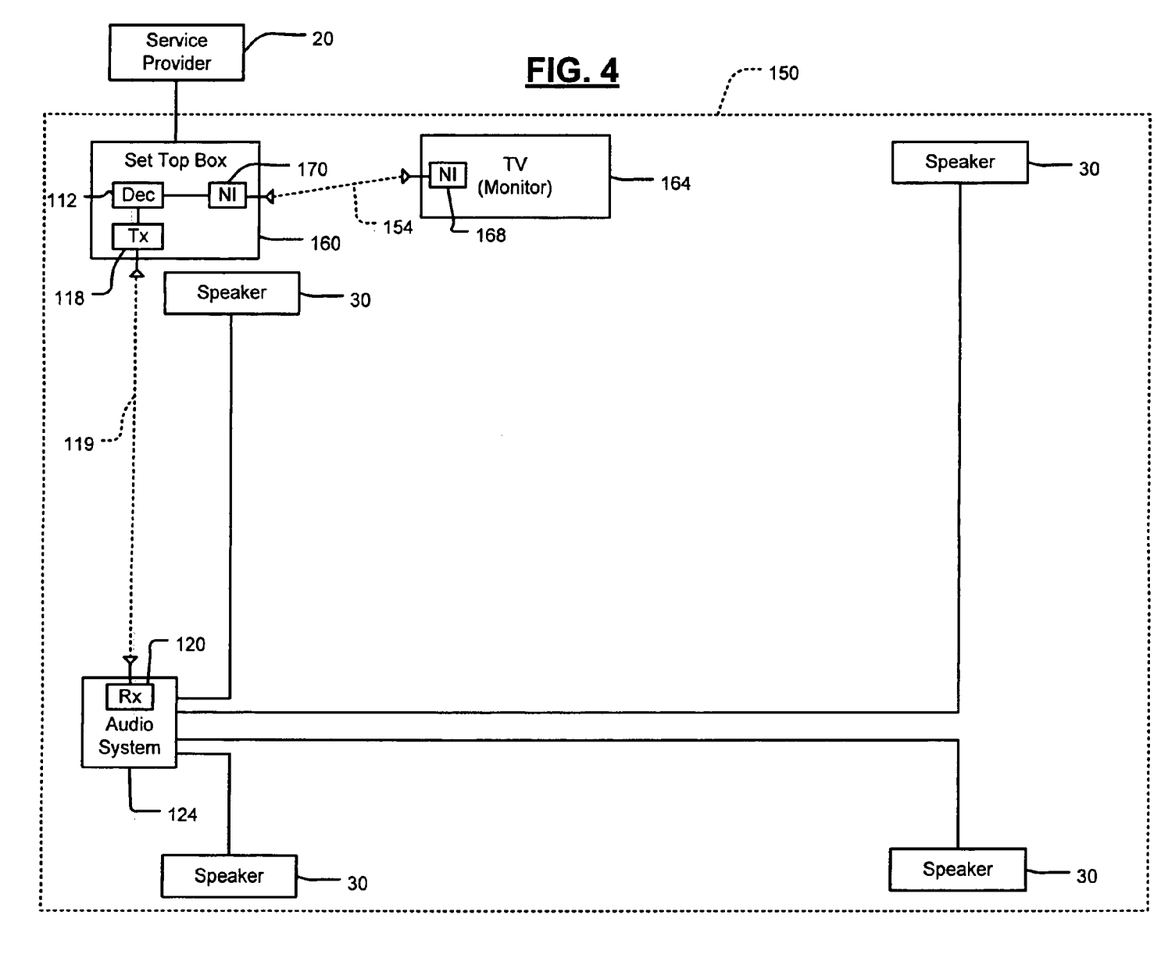
FIG. 4 is a functional block diagram of an entertainment system according to the present invention including wireless links between the set top box and the audio system and the television or monitor.

Referring now to FIG. 4, an entertainment system 150 according to the present invention includes a high bandwidth wireless link 154 between a set top box 160 and the television or monitor 164. The entertainment system 150 includes a low bandwidth wireless link 154 between the set top box 160 and the audio system 124. The TV or monitor 164 includes a network interface 168. Likewise the set top box 160 includes a network interface 170. The network interface 170 may be implemented by the 802.11 interface 92. The video signals are transmitted via the wireless link 154 to the TV or monitor 164. For example, the wireless link 154 can be 802.11a, 802.11b, 802.11g, and/or 802.11n compliant. The audio signals are transmitted via the wireless link 119 in a manner similar to that described above. The transmitter 118 can be implemented by the transmitter 103 and/or the Bluetooth interface 95. In some implementations, the audio and video signals are received in digital form and are separated and sent to the television or monitor and the audio receiver in digital form without conversion to analog format.

Figure 5:
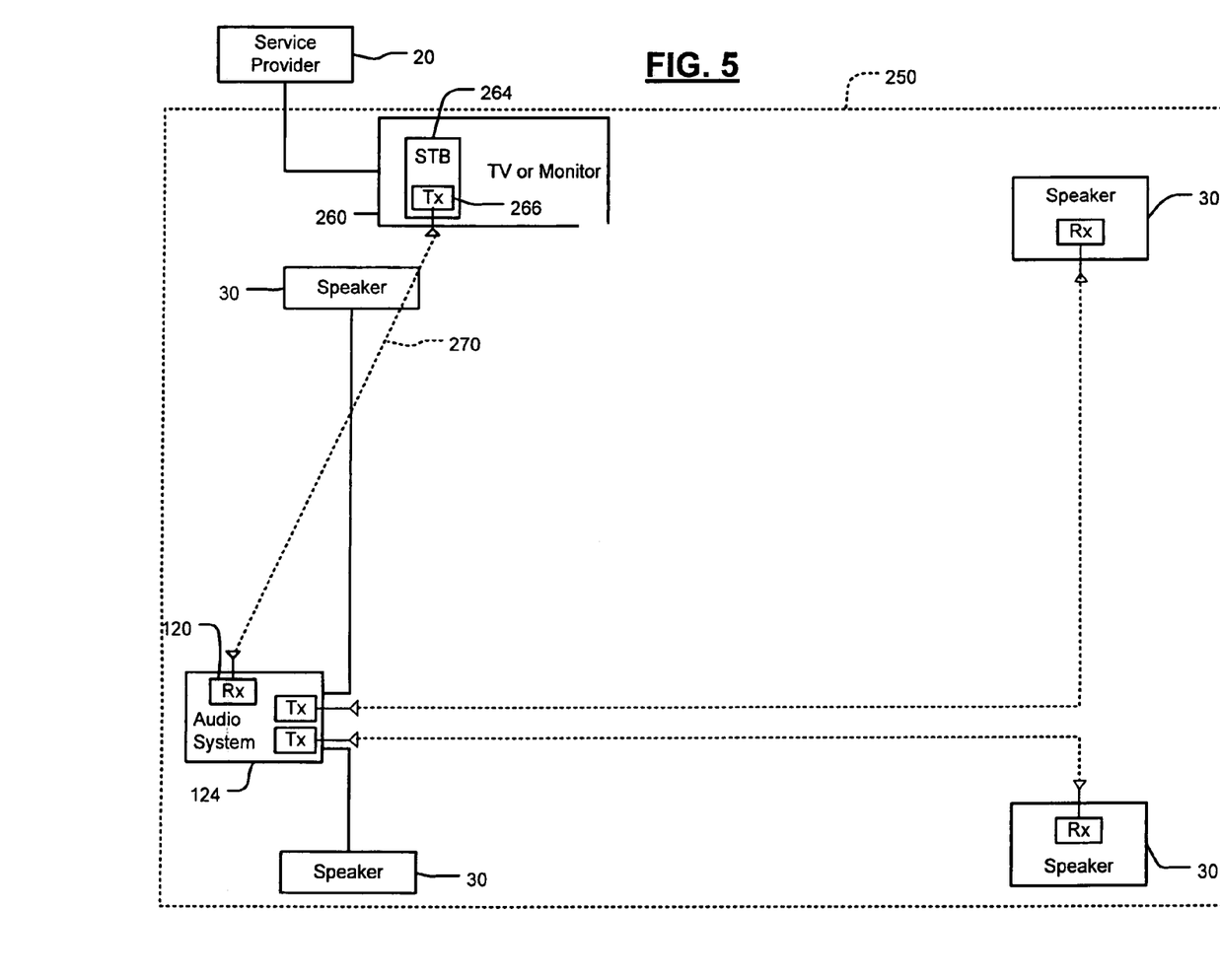
FIG. 5 is a functional block diagram of an entertainment system according to the present invention with a television or monitor having an integrated set top box and including a wireless link between the television or monitor and the audio system.

Referring now to FIG. 5, an entertainment system 250 according to the present invention includes a television or monitor 260 having an integrated set top box 264. The set top box 264 generates an audio output to a transmitter module 266, which generates a wireless link 270 containing channels of the audio signal. The set top box 264 may include a decoding module as described in FIG. 2. The audio system 124 includes one or more transmitters 267 and 268 that generate wireless audio signals and the speakers 30 include and/or are connected to receivers 269 and 270 that receives the wireless signals. In some implementations, the audio and video signals are received in digital form and are separated and sent to the television or monitor and the audio receiver in digital form without conversion to analog format.

Figure 6:
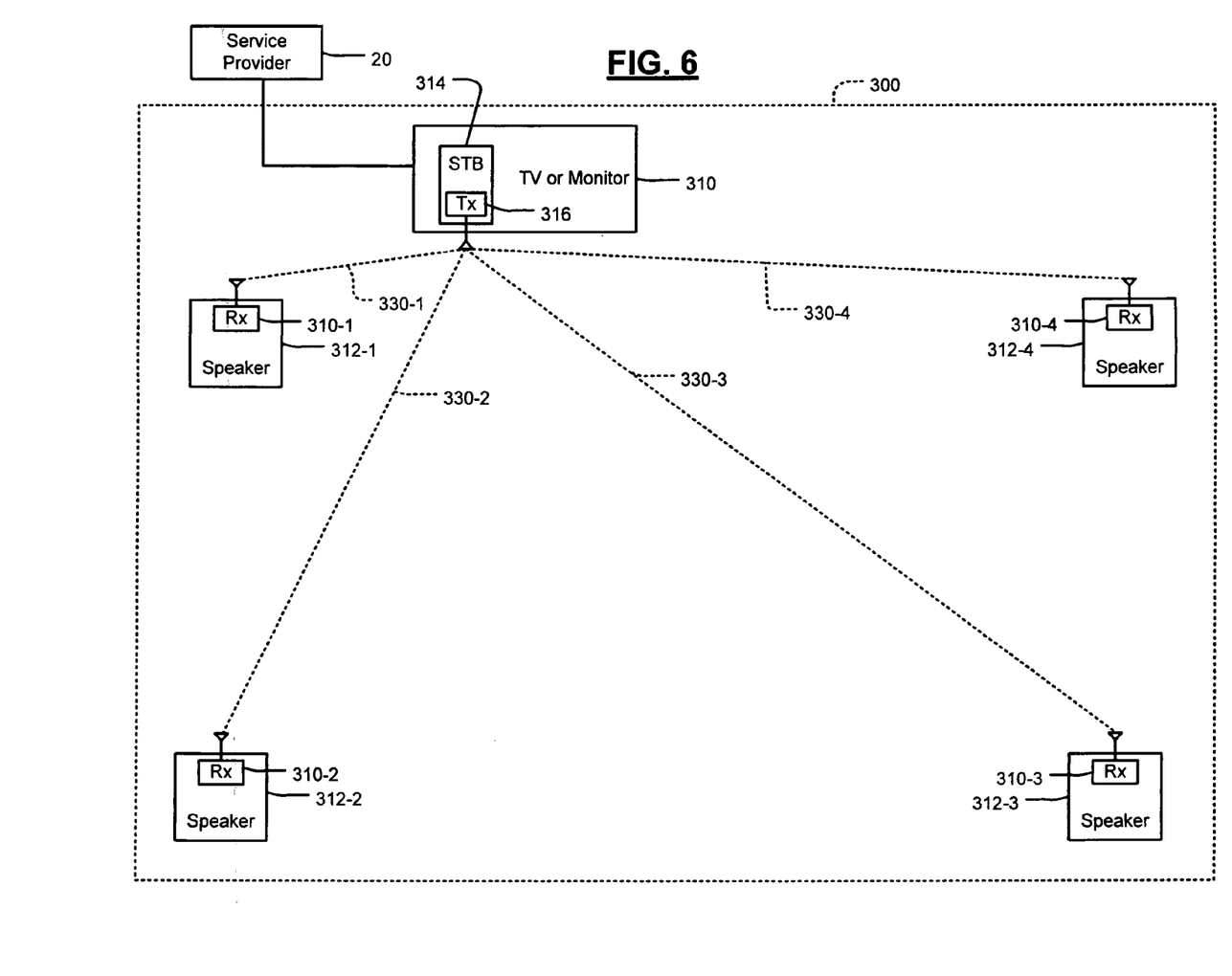
FIG. 6 is a functional block diagram of an entertainment system according to the present invention with a television or monitor having an integrated set top box and including a wireless link between the television or monitor and speakers.

Referring now to FIG. 6, an entertainment system 300 according to the present invention includes a television or monitor 310 having an integrated set top box 314 and a transmitter module 316. The transmitter module 316 generates wireless links 330-1, 330-2, 330-3 and 330-4 (collectively 330) directly between the television or monitor 310 and receivers 310-1, 310-2, 310-3 and 310-4 (collectively 310) associated with speakers 312-1, 312-2, 312-3 and 312-4 (collectively 312). In some implementations, the audio and video signals are received in digital form, are separated and are sent to the television or monitor and the audio receiver in digital form without conversion to analog format.

Figure 7:
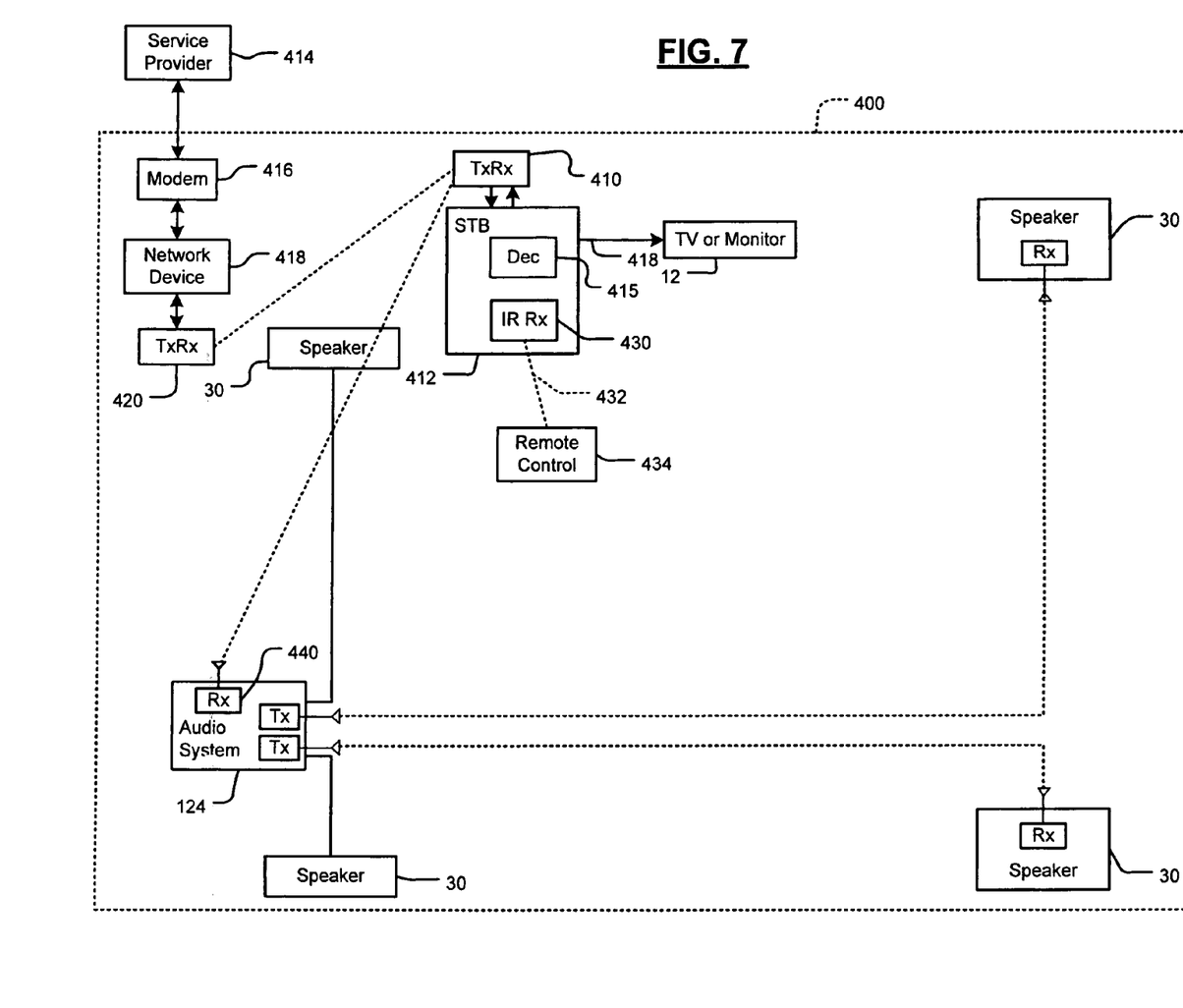
FIG. 7 is a functional block diagram of an entertainment system according to the present invention with a wireless transceiver that wirelessly receives content, a set top box that separates the content into audio and video portions and transmits the audio portion to the wireless transceiver, which provides a wireless link to an audio system with speakers and the video portion to a display.

Referring now to FIG. 7, an entertainment system 400 according to the present invention is shown to include a wireless transceiver 410 that wirelessly receives audio and video content that can be in analog or digital format. The wireless transceiver 410 can receive the wireless signals from any wireless source. In some implementations, the wireless content that is received by the transceiver 410 can be in any current or future MPEG format, although other formats may be used. The wireless transceiver 410 outputs the received wireless content to a set top box 412, which separates the received content into audio and video signals, outputs the audio signals back to the transceiver 410 and the video signals to the TV or monitor 12. The transceiver 410 retransmits the audio signals to the audio system 124.

While the following discussion relates to one suitable approach for delivering the wireless audio and video content to the wireless transceiver 410, skilled artisans will appreciate that other approaches may be used. In some implementations, a service provider 414 may generate analog and/or digital broadband signals that are received by a modem 416. The broadband signals may be cable-based, satellite-based, DSL-based, wireless-based or any other suitable broadband source. A network device 418 such as a computer with a network interface receives content from the modem 416. In some implementations, the modem 416 includes a tuner that tunes a selected channel, demodulates the signal and converts the signal from analog to digital format. If in digital format, the modem 416 may include a digital receiver that receives and decodes the digital content. Alternately, the modem 416 may not include the tuner/digital receiver and the network device 418 may receive the broadband signal directly from the service provider 416. In this approach, the network device 418 includes a digital receiver and/or a tuner that outputs audio and video content to a wireless transceiver 420 for wireless transmission to the wireless transceiver 410.

The set top box 412 communicates with the transceiver 410 and includes a decoder 425 that separates the content into the audio and video signals. In some implementations, the set top box 424 includes an infrared (IR) receiver 430 that receives wireless signals 432 containing user inputs such as channel identification from a wireless remote control 434 and/or directly via buttons on the set top box 412. Based on the received user inputs, the set top box 412 provides the channel identification to the transceiver 410, which outputs the selected channel the wireless transceiver 420. The channel selection is used by the digital receiver and/or tuner associated with the network device 418 and/or modem 416 to decode or tune the selected channel.

The audio portion 426 is output to the transceiver 410, which transmits the audio signals to the audio system 124 and speakers 30. In some embodiments, the decoder 425 outputs the video portion alone and/or audio and video to the TV or monitor 12.

The audio portion output by the decoder 425 may include digital packets containing audio and/or an analog signal. When audio packets are used, a receiver 430 associated with the audio system 124 receives the audio packets and generates analog signals based thereon. In some implementations, the receiver 440 includes a converter for converting the digital packets to analog signals. Alternately, when analog signals are used such as FM signals, the receiver 440 may include a FM tuner that demodulates the FM signal containing the audio content.

In some implementations, transceiver 410 employs wireless fidelity (WiFi) such as 802.11, 802.11a, 802.11b, 802.11g, 802.11n (which are all hereby incorporated by reference) and other current or future 802.11 wireless standards, frequency modulation, Worldwide Interoperability for Microwave Access, Inc. (group promoting IEEE 802.16 wireless broadband standard) (WiMax) and/or ultrawideband (UWB) wireless formats for communication with the transceiver 420 and/or the receiver 430.

Figure 8:
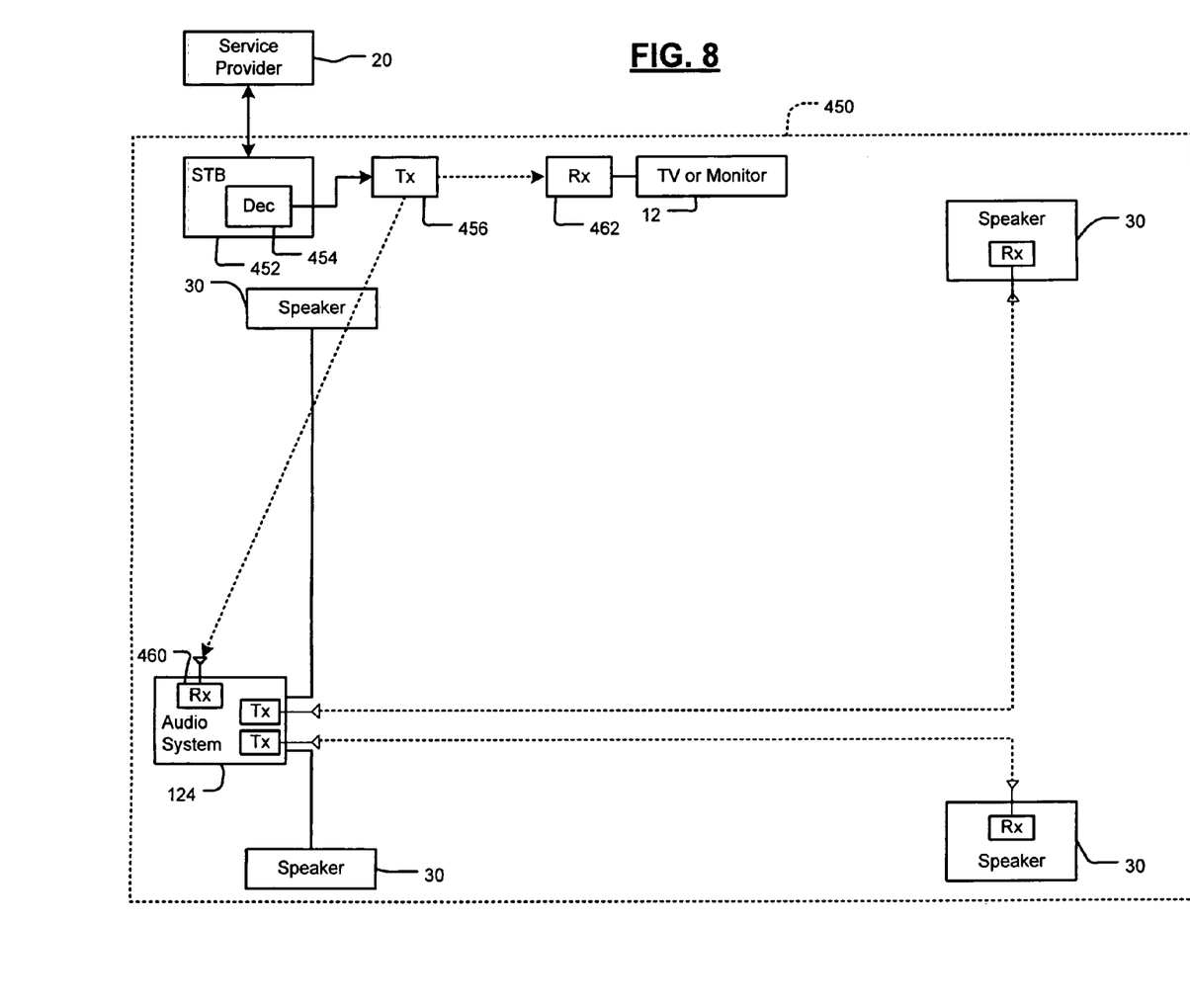
FIG. 8 is a functional block diagram of an entertainment system according to the present invention including a set top box including a decoder that parses content into audio and video data packet streams and a wireless transmitter that transmits the audio data packets to a receiver associated with an audio system and the video data packets to the monitor.

Referring now to FIG. 8, an entertainment system 450 according to the present invention is shown to include a set top box 452 that receives content such as digital broadband signals including audio and video content. The set top box 452 includes a decoder 454 that parses or separates the content into audio and video packet streams. The parsed data packet streams are output to a wireless transmitter 456 that transmits the audio packets to a receiver 460 associated with the audio system 124 and the video packets a receiver 462 associated with the monitor 12. The audio packets may also be transmitted to the monitor 12 as well. The transmitter and receivers in this embodiment may operate using any of the protocols described above.

Those skilled in the art can now appreciate from the foregoing description that the broad teachings of the present invention can be implemented in a variety of forms. For example, while some implementations include 4 or 5 audio speakers and channels, any number of audio speakers and channels may be used. In addition, the number of speakers and channels need not be the same. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system comprising:
signal receiving means for receiving digital broadband signals and for tuning a channel including digital audio and video signals;
signal demodulating means for communicating with said signal receiving means and for demodulating said digital audio and video signals;
a set top box comprising decoding means for decoding said demodulated digital audio and video signals to generate digital audio output signals and digital video output signals,
wherein said decoder outputs said digital video output signals on a first medium; and
transceiver means for receiving said demodulated digital audio and video signals and for transmitting said digital audio output signals via a second medium, wherein said first medium has a greater bandwidth capacity and a different protocol than said second medium,
wherein said transceiver means transmits said digital audio output signals from said set top box to an audio system, and
wherein said transceiver means is remote from said set top box.

2. The system of claim 1, further comprising:
display means for communicating with said first medium; and
audio means for generating audio signals and that includes receiving means for receiving that communicates with said second medium.

3. The system of claim 2, wherein said display means is selected from a group consisting of televisions and monitors.

4. The system of claim 2, wherein said set top box is integrated with said display means.

5. The system of claim 2, wherein said set top box is located remotely from said display means.

6. The system of claim 1, further comprising audio means for generating audio signals and that includes receiving means for receiving said digital audio output signals.

7. The system of claim 6, wherein said audio means includes a plurality of transmitting means for transmitting and further comprising a plurality of speaker means for outputting audible audio signals and each including receiving means for communicating with a respective one of said transmitting means.

8. The system of claim 1, wherein a bandwidth capacity of said first medium is greater than 50 Mb/s and a bandwidth capacity of said second medium is less than 1 Mb/s.

9. The system of claim 1, further comprising:
display means for communicating with said first medium; and
audio means for generating audio signals and that includes audio receiving means for wirelessly communicating with said transceiver means and audio output means for generating audible audio signals and that is connected to said audio receiving means by a connection that is selected from a wireless connection and a wired connection.

10. The system of claim 1, further comprising:
display means for communicating with said first medium, wherein said first medium is a wireless medium, said set top box includes first interface means for providing a first wireless interface to said first medium and said display means includes second wireless means for providing a second wireless interface to said first medium; and
audio means for generating audio signals and that includes audio receiving means for wirelessly communicating with said transceiver means and audio output means for generating audible audio signals and that is connected to said audio receiving means by a connection that is selected from a wireless connection and a wired connection.

11. The system of claim 1, further comprising:
display means for communicating with said first medium; and
audio means for generating audio signals that includes audio receiving means for wirelessly communicating with said transceiver means and audio output means for generating audible audio signals that is connected to said audio receiving means by a connection that is selected from a wireless connection and a wired connection.

12. The system of claim 1, further comprising:
display means for communicating with said first medium; and
audio output means for generating audible audio signals that includes receiving means for wirelessly communicating with said transceiver means of said set top box.

13. A method for operating a set top box, comprising:
receiving demodulated digital audio and video signals via a first transceiver by said set top box;
decoding said demodulated digital audio signals to generate digital audio output signals;
decoding said demodulated digital video signals to generate digital video output signals and transmitting said digital video output signals via a first medium;
transmitting said digital audio output signals by said first transceiver via a second medium, wherein said first medium has a greater bandwidth capacity and a different protocol than said second medium;

wirelessly receiving said demodulated digital audio and video signals from a network device by said first transceiver via a second transceiver;

transmitting said digital audio output signals to an audio system via said first transceiver; and transmitting said digital video output signals to a display.

14. The method of claim 13, further comprising outputting said digital video output signals to said display, wherein said display is selected from a group consisting of televisions and monitors.

15. The method of claim 13, wherein said first medium is a wireless medium that communicates using at least one of I.E.E.E. 802.11a, 802.11b, 802.11g, 802.11n, 802.16, and ultrawideband (UWB) formats.

16. The method of claim 13, further comprising receiving said digital audio output signals at said audio system via said second medium.

17. The method of claim 13, wherein a bandwidth capacity of said first medium is greater than 50 Mb/s and a bandwidth capacity of said wireless medium is less than 1 Mb/s.

18. The method of claim 13, further comprising providing a speaker that is connected to said receiver by a connection that is selected from a wireless connection and a wired connection wherein said display communicates with said first medium, and wherein said first medium is a wired medium, and wherein said audio system wirelessly communicates with said second medium.

19. The method of claim 13, further comprising providing a speaker that is connected to said receiver by a connection that is selected from a wireless connection and a wired connection wherein said display communicates with said first medium, and wherein said first medium is a wireless medium, said set top box includes a first wireless network interface and said display includes a second wireless network interface;

wherein said audio system that wirelessly communicates with said second medium.

20. The method of claim 13, further comprising providing a speaker that is connected to said receiver by a connection that is selected from a wireless connection and a wired connection, wherein said audio system that wirelessly communicates with said second medium.

21. The method of claim 13, further comprising providing a speaker that wirelessly communicates with said second medium.

22. The method of claim 13, wherein said demodulated digital audio signals and video signals are wirelessly received from a network device that is remote from said first transceiver, and wherein said network device includes a computer.

23. The method of claim 13, wherein said demodulated digital audio and video signals are wirelessly received from a network device that is remote from said first transceiver via another transceiver.

24. The method of claim 23, further comprising:

generating a channel identification by the set top box;

transmitting said channel identification to said network device; and receiving said demodulated digital audio and video signals based on said channel identification from said network device.

25. The method of claim 13, further comprising:

generating a channel identification by said set top box;

transmitting said channel identification to said network device via said first transceiver and said second transceiver; and receiving said demodulated audio and video signals from said network device based on said channel identification by said set top box.

26. The method of claim 13, further comprising wirelessly transmitting said digital audio output signals via said first transceiver directly to receiver modules of a respective plurality of individual speakers.

27. The method of claim 13, wherein said first transceiver is wirelessly remote from said network device.

28. The method of claim 13, wherein said demodulated digital audio and video signals are received by said first transceiver via a second transceiver that is wireless remote from said first transceiver.

29. A system comprising:

a signal receiver that includes a front end that receives digital broadband signals and a tuner that tunes a channel including digital audio and video signals;

a signal demodulator that communicates with said signal receiver and that demodulates said digital audio and video signals;

a set top box comprising a decoder that decodes said demodulated digital audio and video signals to generate digital audio output signals and digital video output signals, wherein said decoder outputs said digital video output signals on a first medium; and a transceiver that receives said demodulated digital audio and video signals and that transmits said digital audio output signals via a second medium, wherein said first medium has a greater bandwidth capacity and a different protocol than said second medium, and wherein said second medium is a wireless medium, wherein said transceiver transmits said digital audio output signals from said set top box to an audio system, and wherein said transceiver is remote from said set top box.

30. The system of claim 29, further comprising a display that communicates with said first wireless medium, wherein said audio system includes a receiver that communicates with said second medium.

31. The system of claim 30, wherein said display is selected from a group consisting of televisions and monitors.

32. The system of claim 30, wherein said set top box is integrated with said display.

33. The system of claim 30, wherein said set top box is located remotely from said display.

34. The system of claim 30, wherein said display further comprises a first transmitter module that communicates with said first medium.

35. The system of claim 29, further comprising a first wireless network interface that communicates with said video processor, wherein said first medium is a wireless medium.

36. The system of claim 35, wherein said first wireless network interface communicates using at least one of I.E.E.E. 802.11a, 802.11b, 802.11g, 802.11n, 802.16, and ultrawideband (UWB) formats.

37. The system of claim 29, wherein said audio system includes a receiver module that communicates with said audio system and that receives said digital audio output signals.

38. The system of claim 37, wherein said audio system includes a plurality of transmitter modules and further comprising a plurality of speakers each including a receiver module that communicates with a respective one of said transmitter modules.

39. The system of claim 29, wherein a bandwidth capacity of said first medium is greater than 50 Mb/s and a bandwidth capacity of said second medium is less than 1 Mb/s.

40. The system of claim 29, further comprising
a display that communicates with said first medium, and wherein said first medium is a wired medium,
wherein said audio system includes an audio receiver that wirelessly communicates with said transmitter and a speaker that is connected to said audio receiver by a connection that is selected from a wireless connection and a wired connection.

41. The system of claim 25, further comprising
a display that communicates with said first medium, and wherein said first medium is a wireless medium, said set top box includes a first wireless network interface and said display includes a second wireless network interface that communicates with said first wireless network interface,
wherein said audio system includes an audio receiver that wirelessly communicates with said transceiver and a speaker that is connected to said audio receiver by a connection that is selected from a wireless connection and a wired connection.

42. The system of claim 29, further comprising
a display,
wherein said audio system includes an audio receiver that wirelessly communicates with said transceiver and a speaker that is connected to said audio receiver by a connection that is selected from a wireless connection and a wired connection.

43. The system of claim 29, further comprising:
a display; and
a speaker that includes a receiver that wirelessly communicates with said transceiver.

44. The system of claim 29, wherein said audio system includes a receiver module that receives said digital audio output signals via said second medium,
wherein said audio system includes a plurality of transmitter modules that each wirelessly communicate with a respective one of a plurality of remote speakers, and
wherein each of said plurality of remote speakers includes a receiver module that communicates with a respective one of said plurality of transmitter modules.

45. The set top box of claim 44, wherein said digital audio output signals are wirelessly transmitted directly to a plurality of remote speakers from the set top box.

46. The system of claim 29, wherein said set top box is physically integrated with said display.

47. The system of claim 46, wherein said display includes a monitor.

48. The system of claim 29, wherein said transceiver is external to said set top box.

49. The system of claim 29, wherein said transceiver receives said demodulated digital audio and video signals from said signal demodulator and receives said digital audio output signals from said set top box.

50. The system of claim 29, wherein said decoder outputs said digital audio output signals to said transceiver.

51. The system of claim 29, wherein said decoder receives said demodulated digital audio and video signals from said transceiver.

* * * * *

UNITED STATES PATENT AND TRADEMARK OFFICE
CERTIFICATE OF CORRECTION

PATENT NO. : 7,610,013 B2 Page 1 of 1
APPLICATION NO. : 11/135557
DATED : October 27, 2009
INVENTOR(S) : Sehat Sutardja It is certified that error appears in the above-identified patent and that said Letters Patent is hereby corrected as shown below:

Cover page, Column 1, Item (75) Inventor:    Delete "Sehat Suturdja" and insert --Sehat Sutardja--

Signed and Sealed this

Sixteenth Day of November, 2010

David J. Kappos
*Director of the United States Patent and Trademark Office*